May 2, 1933.  F. HESS  1,906,852
SOLDERING IRON
Filed Sept. 22, 1930
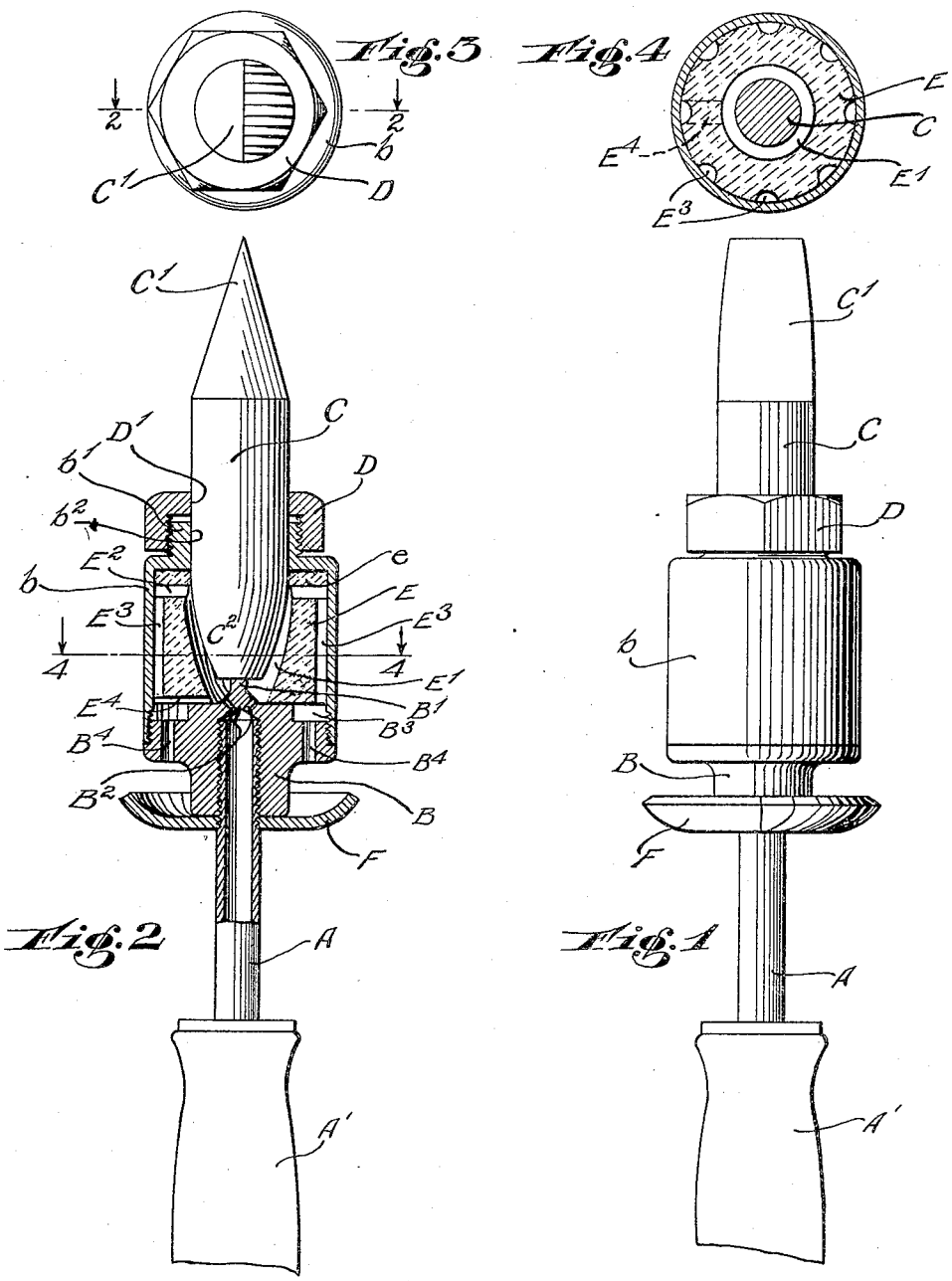
INVENTOR.
FRED HESS
BY John E. Hubbell
ATTORNEYS.

Patented May 2, 1933

1,906,852

UNITED STATES PATENT OFFICE

FRED HESS, OF PHILADELPHIA, PENNSYLVANIA, ASSIGNOR, BY MESNE ASSIGNMENTS, TO THE SELAS COMPANY, OF PHILADELPHIA, PENNSYLVANIA, A CORPORATION OF PENNSYLVANIA

SOLDERING IRON

Application filed September 22, 1930. Serial No. 483,427.

The present invention consists in an improved soldering iron of the type comprising a burner head in which gaseous fuel is burned to heat the iron, devised with the general object of improving the construction and operating properties of a soldering iron of the type specified.

More specific objects of the present invention are to provide a soldering iron characterized by the simplicity and effectiveness of its construction, and by the efficient and desirable manner in which the fuel for heating the iron is burned and the heat thereby generated is transferred to the copper point or soldering "iron" proper.

The various features of novelty which characterize my invention are pointed out with particularity in the claims annexed to and forming a part of this specification. For a better understanding of the invention and its specific objects and advantages, reference should be had, however, to the accompanying drawing and descriptive matter, in which I have illustrated and described a preferred embodiment of the present invention.

Of the drawing:

Fig. 1 is an elevation of a soldering iron;

Fig. 2 is an elevation partly in section on the line 2—2 of Fig. 3;

Fig. 3 is an end view of the iron; and

Fig. 4 is a section on the line 4—4 of Fig. 2.

The soldering iron shown in the drawing comprises a tubular stem member A which is connected at one end to the burner head portion of the iron, and through which premixed air and gas for heating the iron is supplied to the combustion chamber in said head. At a suitable distance from the burner head end of the stem A, the latter is provided with a handle part A'. The burner head comprises a metallic casing composed of two parts or members B and $b$. The member B is provided with a central threaded socket into which the threaded end of the stem A is screwed, and is externally threaded for connection with the member $b$. The latter is cup-shaped and is internally threaded at its open end to receive the externally threaded portion of the member B. At its end remote from the member B, the member $b$ is formed with an external and externally threaded boss $b'$ with a passage $b^2$ extending therethrough. The soldering iron proper or copper part C extends into the burner head casing through said passage $b^2$.

The part C is secured in place by a cup-shaped member D threaded onto the boss $b'$ and formed with an aperture D' through which the part C extends. As shown, the passage $b^2$ in the part $b$ is coaxial with the stem A, but the boss $b'$ and member D are eccentrically disposed with respect to the stem. The aperture D' in the member D which in one angular position of the latter is in register with the opening $b^2$, is eccentrically disposed with respect to the periphery of the member D. In consequence, the part C may be rigidly clamped in place or released by turning the member D through a few degrees in one direction or the other to move the opening D' out of, or into register with the opening $b^2$. The described clamping means provided makes it possible to secure the part C in place with desirable rapidity and mechanical security and rigidity without requiring careful machining of the part C. The latter, therefore, may well be formed from copper bar or rod stock, and needs only such machining as is necessary to give a suitable shape to its working point C', though advantageously the opposite end $C^2$ is tapered off as shown. Advantageously the inserted end of the part C abuts against a projection B' formed on the corresponding end of the member B.

Mounted within the burner head casing formed by the metallic parts B and $b$ is refractory material which for manufacturing and replacement purposes may advantageously be made of two parts E and $e$.

The part E is shown as a cylindrical block fitting snugly within the cylindrical body portion of the member $b$ and hollowed out to form a central combustion chamber E' surrounding the inserted end of the copper part C. Air and fuel supplied by the tube A enter the chamber E' through inclined ports $B^2$ in the part B. The member $e$ is in the form of a washer fitting closely about the part C and interposed between the closed end of the member $b$ and the block E. The part $e$ closes the otherwise open sides of radial grooves $E^2$ formed in the adjacent end of the block E through which the products of combustion pass away from the combustion chamber $E'$. The grooves or channels $E^2$ communicate at their outer ends with, and discharges gases into longitudinal grooves $E^3$ formed in the peripheral wall of the block E. The otherwise open outer sides of the grooves $E^3$ are closed by the adjacent portions of the cylindrical body portion of the member $b$. The channels $E^3$ communicate at their ends adjacent the member B with an annular groove or channel $B^3$ located between a reduced portion of the end member B and the surrounding portion of the member $b$. Products of combustion are discharged into the atmosphere from the channel $B^3$ through the longitudinal ports $B^4$.

A deflecting member F threaded on the stem A at the base of the member B deflects the gases issuing through the ports $B^4$ away from the handle portion $A'$ of the soldering iron. A radial channel $E^4$ formed in the base of the member E and having its outer end adjacent one of the channels $B^4$, is provided for use in igniting the mixture of fuel gas and air entering the chamber $E'$ through the ports $B^2$ in starting the soldering iron into operation.

The soldering iron construction shown and described is characterized by an inherent capacity for a higher thermal efficiency than is obtainable with soldering irons now in use. Its characteristic high thermal efficiency is primarily due to the refractory combustion chamber wall formed by the part E. The outer wall of the chamber $E'$ becomes white hot in operation and its use insures true and efficient surface combustion. The major portion of the heat absorbed by the member E is transferred by radiation to the part C. A considerable portion of the heat developed by combustion is transmitted directly to the part C from the burning gases, by radiation and by contact and conduction. The surface of the copper part C absorbing heat from the gases by radiation from the wall of the chamber $E'$ is relatively large.

With the gas flow out of the chamber $E'$ through the multiplicity of channels $E^2$ and $E^3$, and the relatively thin metallic walls for the outer sides of the passages $E^3$ formed by the corresponding portions of the part $b$, the gases are cooled below the ignition temperature before issuing from the ports $B^4$, under all normal operating conditions. In consequence, there is practically no possibility for the issuance of flames from the burner head even under adverse combustion conditions.

The ignition of the fuel through the port $E^4$ in starting the soldering iron into operation is effected with comparative ease. The iron is noiseless in operation. The copper part C may be replaced with ease whenever a differently shaped working point is required, or when the deterioration of the part C makes replacement necessary, and such replacement can be readily effected without allowing the iron as a whole to cool off, and indeed it may be effected without interrupting the supply of fuel gas and air to the chamber $E'$. The lighter and more easily destructible parts of the burner head are protected against flame impingement, and this adds to the effective life of the iron.

While in accordance with the provisions of the statutes, I have illustrated and described the best form of my invention now known to me, it will be apparent to those skilled in the art that changes may be made in the form of the apparatus disclosed without departing from the spirit of my invention, as set forth in the appended claims, and that certain features of my invention may sometimes be used to advantage without a corresponding use of other features.

Having now described my invention what I claim as new and desire to secure by Letters Patent, is:

1. A soldering iron comprising a metallic burner head casing formed with an aperture in its wall, a soldering iron part proper extending into said casing through said aperture, refractory material in said casing shaped to form the outer wall of a combustion chamber space receiving but not filled by the portion of said part entering said casing, means for supplying a mixture of air and fuel gas to said space, and means for discharging products of combustion from said space.

2. A soldering iron comprising a metallic burner head casing formed with an aperture in its wall, a soldering iron part proper extending into said casing through said aperture, refractory material in said casing shaped to provide a combustion chamber space receiving but not filled by the portion of said part entering said casing and to provide channels for the escape of products of combustion from said space, and means for supplying a mixture of air and fuel gas to said space.

3. A soldering iron comprising a metallic burner head casing formed with an aperture in its wall, a soldering iron part proper extending into said casing through said aperture, refractory material in said casing shaped to provide a combustion chamber space receiving but not filled by the portion of said part entering said casing and to provide channels for the escape of products of combustion from said space, said channels including portions extending along the inner wall of said casing whereby said products are cooled below the ignition temperature before being discharged, and means for supplying a mixture of air and fuel gas to said space.

4. A soldering iron comprising a metallic burner head casing formed with an inlet port and an outlet port in one wall and with an aperture in an opposing wall, a soldering iron part proper extending into said casing through said aperture, refractory material in said casing shaped to form a wall interposed between a central combustion chamber space which surrounds the portion of said part entering said chamber and receives gas from said inlet port, and an outer channel space through which products of combustion pass to said outlet port, said spaces communicating adjacent said opposing wall.

5. A soldering iron comprising a metallic burner head casing formed with an inlet port and an outlet port in one end wall and with an aperture in an opposing wall, a soldering iron part proper extending into said casing through said aperture, refractory material in said casing shaped to form a wall interposed between a central combustion chamber space which surrounds the portion of said part entering said chamber and receives gas from said inlet port, and an outer channel space through which products of combustion pass to said outlet port, said spaces communicating adjacent said opposing wall, and means associated with said opposing wall for releasably securing said part in said aperture.

6. A soldering iron comprising a metallic burner head casing formed with an inlet port and an outlet port in one end wall and with an aperture in an opposing wall, a soldering iron part proper extending into said casing through said aperture, refractory material in said casing shaped to form a wall interposed between a central combustion chamber space which surrounds the portion of said part entering said chamber and receives gas from said inlet port, and an outer channel space through which products of combustion pass to said outlet port, said spaces communicating adjacent said opposing wall, the latter being formed with an external and externally threaded boss through which said aperture extends eccentrically, and a cup-shaped clamping member threaded on said boss and formed with an eccentrically disposed aperture moved into and out of register with the first mentioned aperture by rotation of said member on said boss to thereby release and clamp said part in said aperture.

7. A soldering iron comprising a metallic burner head casing formed with an inlet port and an outlet port in one end wall and with an aperture in an opposing wall, a soldering iron part proper extending into said casing through said aperture, refractory material in said casing shaped to form a wall interposed between a central combustion chamber space which surrounds the portion of said part entering said chamber and receives gas from said inlet port, and an outer channel space through which products of combustion pass to said outlet port, said spaces communicating adjacent said opposing wall, and said refractory material being formed with an ignition channel connecting said outlet port and combustion chamber space at the end of the latter adjacent said inlet port.

8. A soldering iron comprising a metallic burner head casing having separable end walls and a cylindrical portion extending between said end walls, one of said end walls being formed with a central inlet port and an outer outlet port, and the other of said end walls being formed with an aperture, a soldering iron part proper extending through said aperture into said casing, and a block of refractory material fitting in said casing and formed with a central combustion chamber space receiving gas through said inlet port and with peripheral grooves extending longitudinally of said casing and delivering products of combustion to said outlet port and formed with channels in its end remote from said ports connecting said space and grooves.

9. A soldering iron comprising a metallic burner head casing having separable end walls and a cylindrical portion extending between said end walls, one of said end walls being formed with a central inlet port and an outer outlet port, and the other of said end walls being formed with an aperture, a soldering iron part proper extending through said aperture into said casing, and a block of refractory material fitting in said casing and formed with a central combustion chamber space receiving gas through said inlet port and with peripheral grooves extending longitudinally of said casing and delivering products of combustion to said outlet port and formed with channels in its end remote from said ports connecting said space and grooves and with an ignition channel in its end adjacent said ports which connects said combustion space and outlet port.

10. A soldering iron comprising a metallic burner head having separable end walls and a cylindrical portion extending between said end walls, one of said end walls being formed with a central inlet port and an outer outlet port, and the other of said end walls being formed with an aperture, a soldering iron part proper extending through said aperture into said casing, a block of refractory material fitting in said casing and formed with a central combustion chamber space receiving gas through said inlet port and with peripheral grooves extending longitudinally of said casing and delivering products of combustion to said outlet port and with grooves in its end remote from said ports connecting said space to the first mentioned grooves and a washer-like part of refractory material interposed between the grooved end of said block and the adjacent end wall of said casing.

Signed at Philadelphia, in the county of Philadelphia and State of Pennsylvania, this 18th day of September, A. D. 1930.

FRED HESS.